US006736156B2

(12) United States Patent
Beals et al.

(10) Patent No.: US 6,736,156 B2
(45) Date of Patent: May 18, 2004

(54) METHOD AND SYSTEM FOR INSTALLING CABLE IN PRESSURIZED PIPELINES

(75) Inventors: Scott A. Beals, Los Angeles, CA (US); Ronald D. Hammer, Los Angeles, CA (US)

(73) Assignee: Sempra Fiber Links, San Diego, CA (US)

( * ) Notice: Subject to any disclaimer, the term of this patent is extended or adjusted under 35 U.S.C. 154(b) by 116 days.

(21) Appl. No.: 09/876,802

(22) Filed: Jun. 7, 2001

(65) Prior Publication Data

US 2002/0040731 A1 Apr. 11, 2002

Related U.S. Application Data

(63) Continuation-in-part of application No. 09/685,236, filed on Oct. 10, 2000, now Pat. No. 6,536,463.

(51) Int. Cl.[7] .............................. H02G 1/08; H02G 9/06; F16L 1/028; F16L 41/04
(52) U.S. Cl. ................................. 137/15.04; 134/166 C; 137/240; 137/317; 137/357; 254/134.3 R; 254/134.4; 254/134 FT; 405/154.1; 405/183.5; 405/184; 385/100
(58) Field of Search .......................... 73/201; 137/15.03, 137/317, 318, 15.04, 15.05, 240, 357; 226/1; 254/134.3 R, 134.4, 134 FT; 405/154.1, 158, 168.3, 174, 183.5, 184; 134/22.11, 22.12, 166 C; 385/100

(56) References Cited

U.S. PATENT DOCUMENTS

| 920,455 A | 5/1909 | Greenan |
| 1,658,887 A | 2/1928 | Dotzauer |
| 2,930,584 A | 3/1960 | Hensley et al. |
| 3,034,766 A | 5/1962 | Hamrick |
| 4,090,534 A | 5/1978 | Martin et al. |
| 4,169,486 A | * 10/1979 | Otteman ..................... 137/240 |
| 4,232,981 A | 11/1980 | Lee |
| 4,261,204 A | 4/1981 | Donaldson |

(List continued on next page.)

FOREIGN PATENT DOCUMENTS

| DE | 23 55 383 A1 | 5/1975 |
| DE | 3140928 A1 | 5/1983 |
| EP | 0978715 B1 | 2/2000 |
| EP | 0 795 942 B1 | 8/2000 |

OTHER PUBLICATIONS

RM Consulting, Final Report "Fiber Optic Cable In Live Natural Gas Lines", Phase 11A, Nov. 29, 1999, 3 pages.

Gregor, Paul E et al., Alcatel—*Optical Fiber Cable Links With Gas Pipelines As An Alternative Telecommunications Route Technology*, International Wire Cable Symposium Proceedings 1999, 7 pages.

van Heutgen, Wim H.H., "Gastec Glass–in–gas method leads to considerable reduction in laying costs", Gastec NV, 4 pages.

(List continued on next page.)

*Primary Examiner*—George L. Walton
(74) *Attorney, Agent, or Firm*—Perkins Coie LLP

(57) ABSTRACT

A method of introducing a fiber optic conduit into a pressurized gas pipeline includes the step of introducing a translating member into the pressurized gas pipeline via an entry port in a first drilling nipple attached to the pressurized gas pipeline. Tools are deployed within a first pressure lock housing attached to the first drilling nipple by using a first manipulator located in the first air lock housing. The duct rod is advanced within pressurized gas pipeline by a driving mechanism, until a second drilling nipple is reached. The translating member is attached to a fiber optic conduit. The duct rod and fiber optic conduit are then pulled back or pulled forward through the pressurized gas pipeline by the driving mechanism. A conduit is installed in a gas service line, to line the cable or conduit in a natural gas main pipeline to a telecommunications panel in a building.

28 Claims, 14 Drawing Sheets

U.S. PATENT DOCUMENTS

| | | | |
|---|---|---|---|
| 4,427,112 A | | 1/1984 | Di Giovanni et al. |
| 4,518,817 A | | 5/1985 | Kirby et al. |
| 4,649,948 A | | 3/1987 | Hudson |
| 4,756,510 A | | 7/1988 | Klamm et al. |
| 4,856,937 A | | 8/1989 | Grocott et al. |
| 4,869,301 A | * | 9/1989 | Ohmi et al. ............... 137/240 |
| 4,892,442 A | | 1/1990 | Shoffner |
| 4,917,539 A | | 4/1990 | De la Salle |
| 5,042,528 A | | 8/1991 | England et al. |
| 5,090,665 A | | 2/1992 | Walters et al. |
| 5,121,644 A | | 6/1992 | Grey et al. |
| 5,137,047 A | * | 8/1992 | George ...................... 137/240 |
| 5,143,353 A | | 9/1992 | Sano et al. |
| 5,156,376 A | | 10/1992 | Spicer |
| 5,205,542 A | | 4/1993 | Keeble |
| 5,227,080 A | | 7/1993 | Berry |
| 5,360,291 A | | 11/1994 | Shimizu |
| 5,482,073 A | | 1/1996 | Winnie et al. |
| 5,612,499 A | | 3/1997 | Andrew et al. |
| 5,651,639 A | | 7/1997 | Wentworth |
| 5,660,202 A | | 8/1997 | Rush, Jr. et al. |
| 5,749,389 A | * | 5/1998 | Ritrosi et al. ............... 137/240 |
| 5,778,919 A | | 7/1998 | Petrone |
| 5,807,026 A | | 9/1998 | Valette |
| 5,884,384 A | | 3/1999 | Griffioen |
| 5,934,304 A | * | 8/1999 | Peterson et al. ............ 137/240 |
| 5,971,035 A | | 10/1999 | Griffioen |
| 6,019,351 A | | 2/2000 | Allen |
| 6,056,004 A | | 5/2000 | Agnew |
| 6,130,975 A | | 10/2000 | Eyres |
| 6,286,542 B1 | | 9/2001 | Morain et al. |
| 6,301,414 B1 | | 10/2001 | Liese et al. |
| 6,341,188 B1 | | 1/2002 | Serrander et al. |
| 2002/0114595 A1 | | 8/2002 | Potash |
| 2003/0068143 A1 | | 4/2003 | Martinez et al. |

OTHER PUBLICATIONS

Reuters, Telecom stocks are exciting high growth investment opportunities, Mar. 1, 2000, 1 page.

Scott, Latayne C., Nortel Targeting Utilites' Telecom Business, Apr. 21, 2000, 3 pages.

Gastec, "*Glass fiber Optic Cable in Gas Pipes*", Gastec 2000, 30 pages.

* cited by examiner

FIG. 4A
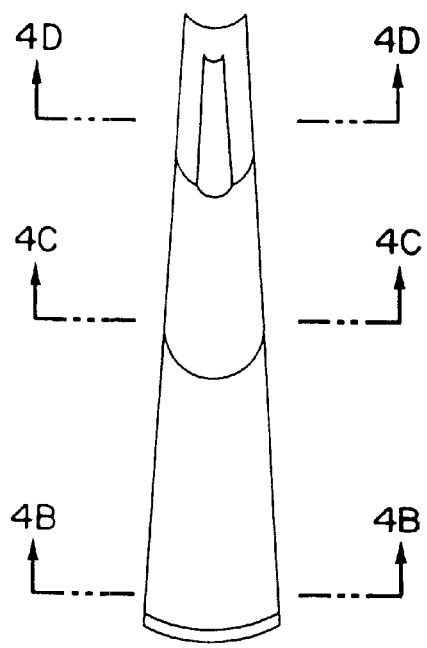
FIG. 4D
FIG. 4C
FIG. 4B

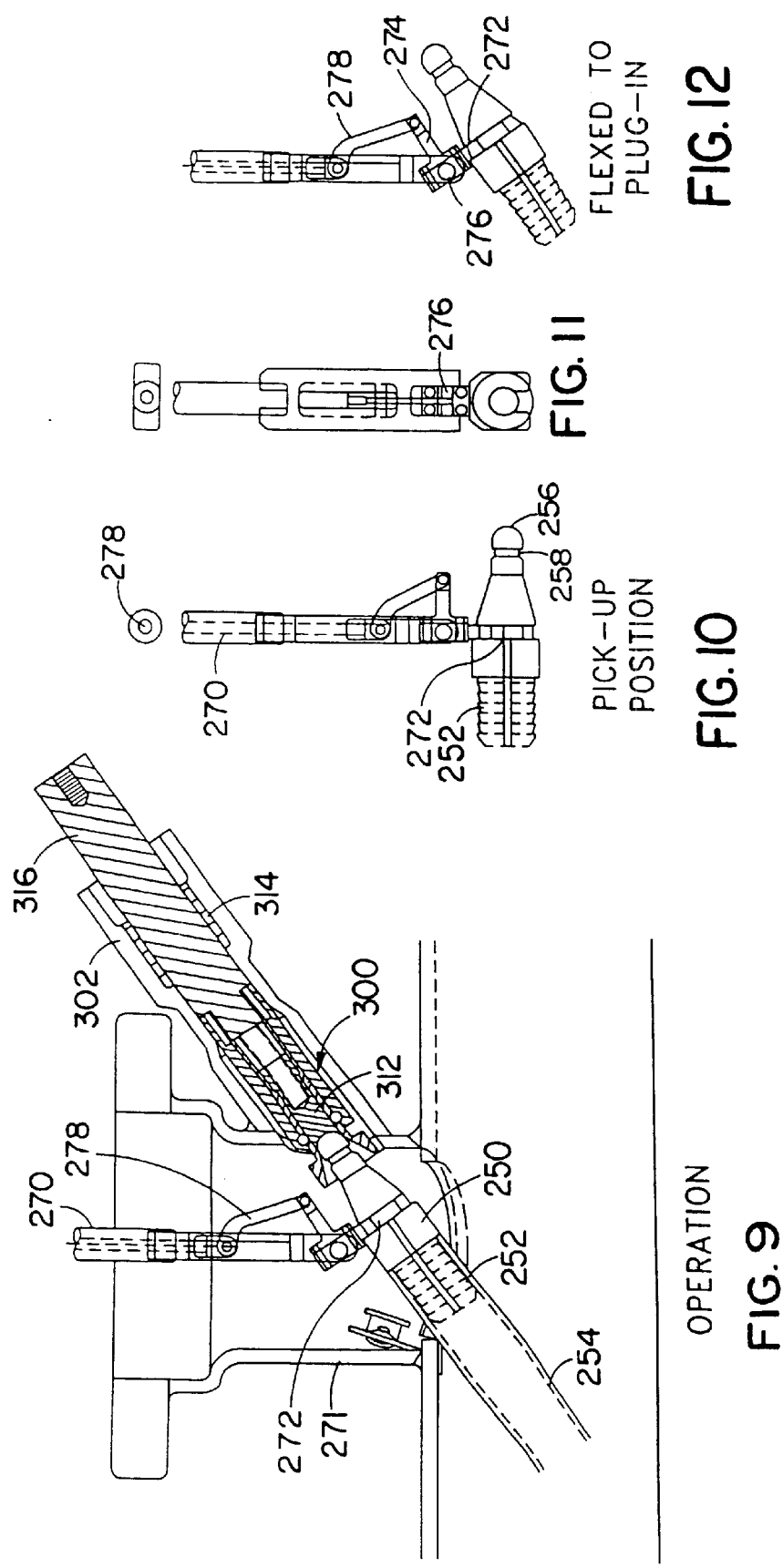

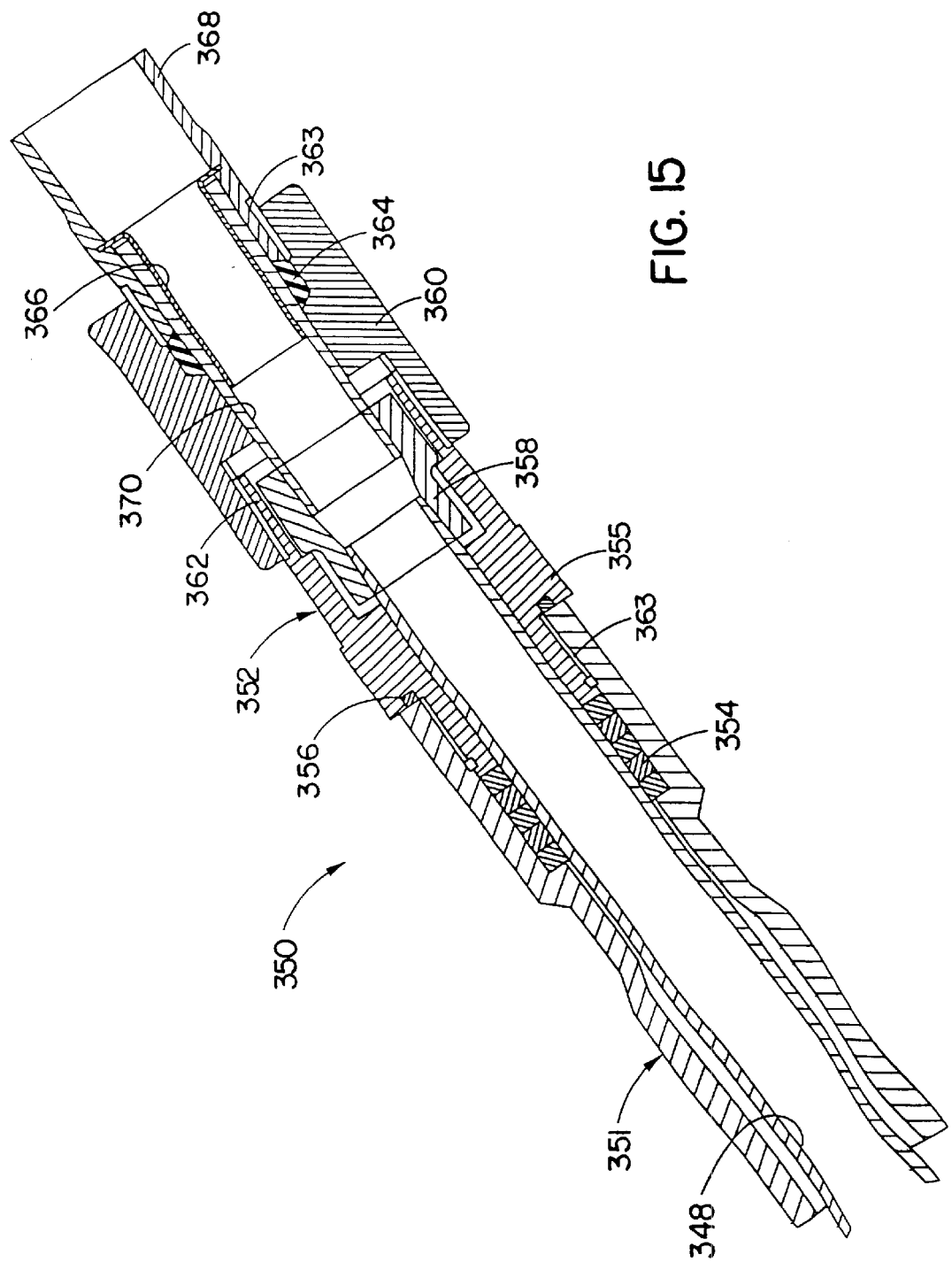

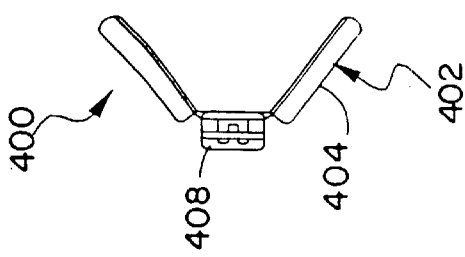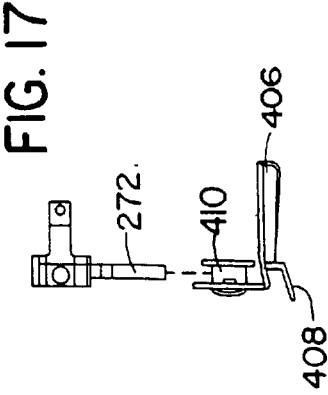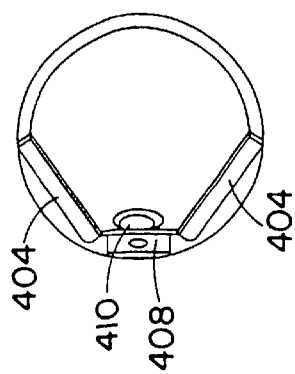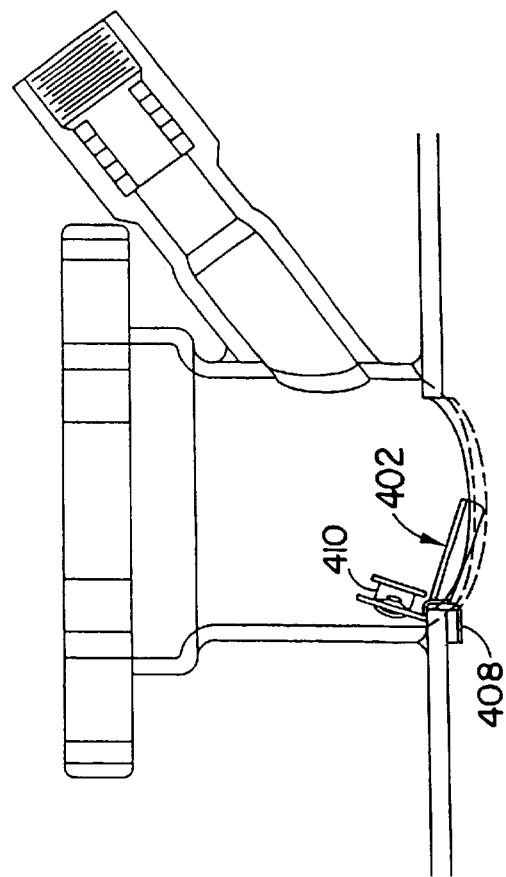

METHOD AND SYSTEM FOR INSTALLING CABLE IN PRESSURIZED PIPELINES

This Application is a Continuation-in-Part of Ser. No. 09/685,236, filed Oct. 10, 2000, now U.S. Pat. No. 6,536, 463.

BACKGROUND OF THE INVENTION

The field of the invention is systems and methods for installing fiber optic cable or similar cables or conduits underground. More specifically, the invention relates to the installation of such cable or conduit into pressurized pipelines, such as natural gas pipelines.

With the tremendous growth of the Internet and telecommunications services in general, there has been a commensurate growth in the need to carry larger and larger volumes of data over existing and newly added communication lines. Existing copper-based communications lines, however, have a limited carrying capacity, or bandwidth, as compared to fiber optic cable. Conventional copper wires also suffer from the problem that the wire bundles are quite large as compared to their fiber optic counterparts. Additional copper wires could be installed to increase the overall capacity of a communications or data network. However, fiber optic cable is now preferred within the communications industry due to its significant advantages over copper wires.

Currently, in the United States, there are existing large scale fiber optic backbones that stretch across wide areas of the country. Unfortunately, many businesses and consumers cannot connect to this fiber optic backbone because they are located some distance away from the main line. If copper-based lines are connected to the fiber optic backbone, the high speed and high bandwidth advantages of fiber optic cable are lost. In order to take advantage of the increased speed and bandwidth provided by fiber optic cable lines, shorter segment fiber optic lines need to be laid to reach these businesses and consumers.

Unfortunately, it is a difficult and costly procedure to lay fiber optic cable in developed regions where infrastructure such as roads, utilities, and the like are already in place. For example, it can be costly to obtain the requisite right-of-ways or easements from numerous different property owners. It can also be very costly to dig trenches to lay fiber optic cable. In addition, it is also often necessary to obtain the approval of various state and local government agencies before such work can begin. This can significantly increase the overall cost and delay the completion of the installation.

Existing gas pipelines have been considered as one potential conduit that can be used to carry fiber optic cable. By using existing gas pipelines, there is no need to obtain numerous right-of-ways or easements, since the fiber optic cable simply resides within the pipeline. In addition, long trenches do not have to be dug to lay the fiber optic cable. However, using gas pipelines as a route for fiber optic cable typically requires that sections or all of the pipeline be shut down for an extended period of time for installation of the cable. Even if the gas pipeline is not completely shut down, existing techniques interrupt the normal flow of gas.

Accordingly, there is a need for a relatively quick and inexpensive way of installing fiber optic cable, or conduit which can be used to house the cable, into existing pipelines such as natural gas pipelines.

SUMMARY OF THE INVENTION

In a first aspect of the invention, a method of installing cable into a pressurized pipeline includes the step of attaching a first air or pressure lock housing to the pressurized pipeline at a first location, preferably via a first access nipple. A second air or pressure lock housing is attached to the pressurized pipeline at a second location, also preferably via a second access nipple. Duct rod is preferably fed into an entry port of the first access nipple. A rod end guide, such as a guide ball, may be attached to the end of the duct rod via a manipulator within the first air lock housing. The duct rod is pushed or routed to the second location and guided into the second access nipple.

The rod end guide or ball, if used, is then advantageously removed from the duct rod via a second manipulator in the second air lock housing. Fiber optic cable or a similar cable or flexible conduit, is attached to the duct rod. The duct rod and the fiber optic cable or conduit are pulled back through the entry port or pulled forward through the second entry port. The pipeline is then sealed and the first and second air lock housings may then be removed. In the case of conduit installation, the fiber optic or other cable can be installed using conventional techniques at any time after the conduit is installed.

A second and separate aspect of the invention includes the steps of attaching a first drilling nipple to the pressurized pipeline at a first location. A first valve is attached to the first drilling nipple. A duct rod is partially inserted into the entry port of the first drilling nipple to seal the entry port. A cutting or drilling tool is attached to the valve, and sealed against the valve. The valve is opened. A pipe cutter of the cutting tool is extended through the open valve to cut or drill a hole into the pressurized pipeline through the first drilling nipple. The cutter is withdrawn and the valve is then closed. The cutting tool is removed.

A first air lock housing is installed on the first valve. The valve is opened and the pressure is equalized between the first air lock housing and the pressurized pipeline. A guide ball or similar duct rod end guide may be attached onto the end of the duct rod using a first manipulator in the first air lock housing.

A second drilling nipple is attached to the pressurized pipeline at a second location. The exit port of the second drilling nipple is sealed. A second valve is attached to the second drilling nipple. A cutting or drilling tool is attached and sealed against the valve. The valve is opened. A cutter is extended from the cutting tool and a hole is cut or drilled into the pressurized pipeline through the second drilling nipple. The cutter is withdrawn and the valve is closed. A second air lock housing is installed on the second drilling nipple. The second valve is opened and pressure is equalized.

A duct rod is pushed along inside of the pressurized pipeline and guided into the second drilling nipple. At the second drilling nipple, the guide ball or other rod end guide, if any, is removed from the duct rod with a second manipulator. The duct rod is attached to a fiber optic cable or conduit. The duct rod and the conduit are pulled through the pipeline (either back or forward). First and second completion plugs are installed on the first and second drilling nipples. The pressure is released in the first and second air lock housings. The first and second air lock housings and the first and second valves can then be removed.

In another aspect of the invention, a guide trough can be advantageously deployed using a manipulator in the air lock housing. The guide trough receives the duct rod or conduit and directs the duct rod or conduit through the exit port. The guide trough is preferably designed to provide guidance for duct rod, fiber optic cable, or conduit without changing troughs. The deployable trough and shield are removably stored in the second and/or first air lock housing. The trough may be left in the pipeline permanently. The trough may be perforated to reduce flow resistance. If the trough is not used, the cable, guide rod or conduit can be guided into the exit gland without use of a trough by the manipulator.

In yet another aspect of the invention, a preferably plastic conduit is used in place of the duct rod. The conduit is typically driven by a driving mechanism and enters the pressurized pipeline via the entry port. The conduit may be used in the methods described above, in place of the duct rod. The fiber optic cable is then pushed, pulled or air-blown through the plastic conduit using conventional installation techniques.

In another aspect of the invention, when a cable is directly installed, a mechanism for sealing the cable to the gas pipeline is employed. For conduit, a conduit seal is installed between the conduit and pipeline, and a cable seal is installed between the cable inserted into the conduit (at a later time) and the conduit.

The method and apparatus allows for the installation of fiber optic or other cable into pressurized gas pipelines without requiring any shutoff or interruption in gas service. In addition, no bypass pipeline is needed to maintain service to customers connected to the pipe section where cable/conduit is being installed.

In another and separate aspect, a method is providing for connecting a conduit or cable from a gas main pipeline, through a service line pipeline, to a building. In this method, the service line is first closed off from the main pipeline. First and second fittings are installed in the service line. A branch line conduit is preferably connected to a cable splice panel, routed through the first fitting, the service line, and the second fitting, and then connected to a telecommunications panel in the building. The fittings are sealed to prevent natural gas leaks after the service line is re-opened to the main pipeline.

The invention resides as well in sub-combinations of the methods and systems described.

It is an object of the invention to provide a method and system for installing fiber optic or similar cable or conduits into existing pressurized gas pipelines without interrupting the flow of gas in the pipeline.

It is also an object of the invention to provide a method for installing fiber optic cable with use of existing standard fittings, to a large extent, to assist in the deployment and reduce the cost of the fiber optic cable installation.

BRIEF DESCRIPTION OF THE DRAWINGS

FIG. 4A is a front view of a guide trough.

FIGS. 4B, 4C and 4D are section views taken at lines 4B—4B, 4C—4C, and 4D—4D of FIG. 4A.

In FIGS. 6 and 7, the pipe nipple, valve, and air lock components are the same on the inlet and exit ends, although they are not fully illustrated on the inlet end. For purposes of illustration, the airlock on the inlet end of FIG. 6 is replaced with the pipe drilling or cutting machine, while in FIG. 7, a top view of the drilling nipple and the hot-tape gate valve is shown.

FIG. 9 is a section view of another embodiment for use with conduit or duct rod.

FIG. 10 is a side view of the manipulator of FIG. 8 in the pick up position.

FIG. 11 is a front view thereof.

FIG. 12 is a side view of the manipulator of FIG. 9 in the plug in position.

FIG. 15 is a section view of a seal for sealing a conduit after it is pulled or routed through a pipeline.

FIG. 16 is a top view of a corner shield.

FIG. 17 is a side view thereof also showing engagement of the corner shield by a manipulator.

FIG. 18 is a top view showing the corner shield of FIG. 16 installed in a pipeline.

FIG. 19 is a side view of the installation shown in FIG. 18.

DETAILED DESCRIPTION OF THE PREFERRED EMBODIMENTS

Figure 1:
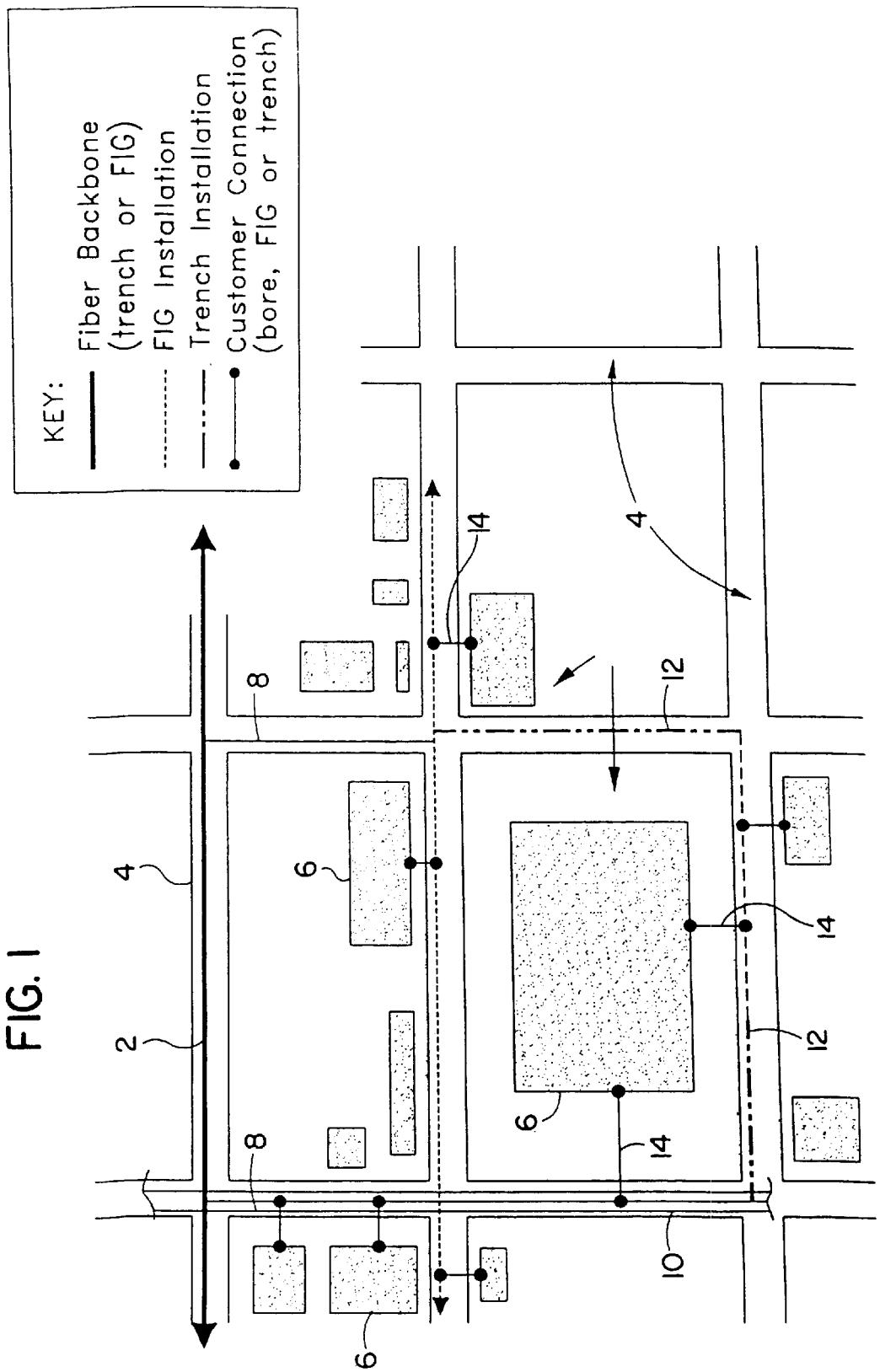
FIG. 1 is a plan view of a geographical area that has installed fiber optic cable or conduit in underground pressurized gas pipelines.

FIG. 1 illustrates a map or plan view of a portion of an urban area such as a city, town, university campus, etc. A main fiber optic backbone 2 runs underneath one or more of the streets 4. Various buildings 6 are dispersed in the vicinity of the main fiber optic backbone 2. These buildings 6 can be individual properties, or alternatively, the buildings 6 can be campuses consisting of multiple properties. Fiber optic conduit 8 that contains one or more bundles of fiber optic cable is shown branching from the main fiber optic backbone 2 under the streets 4. The fiber optic conduit 8 is located in pressurized gas pipelines 10 located underground. The fiber optic conduit 8 is installed in accordance with the methods and devices described in below.

Still referring to FIG. 1, in some of the streets 4 there are no existing pressurized gas pipelines 10, or the pipeline size or available capacity is such that it is not suited for installation of conduit or cable. In this case, the fiber optic conduit 8 is preferably installed in a conventional manner by digging trenches 12 or boring holes through which conduit can be installed. The trenches 12 are preferably dug to meet with existing pressurized gas pipelines 10. In order to get the fiber optic conduit 8 from the pressurized gas pipelines 10 to the buildings 6, individual customer connections 14 are installed to bring the fiber optic cable (contained within fiber optic conduit 8) directly to a customer site. In some instances, such as the larger building 6 shown in the center of FIG. 1, multiple customer connections 14 may be made.

The customer connections 14 may be installed in various ways. For example, a trench 12 can be dug to lay the fiber optic conduit 8 from the pressurized gas pipeline 10. Alternatively, a bore can be drilled or otherwise formed to route the fiber optic conduit 8 into a building. It is also possible that the fiber optic conduit 8 can be directly fed into the pressurized gas pipeline 10 leading to the building 6. This method may be more feasible (due to capacity limitations) where larger diameter service line pipes are used, for example, where the business 6 is a high volume user of natural gas.

Figure 2:
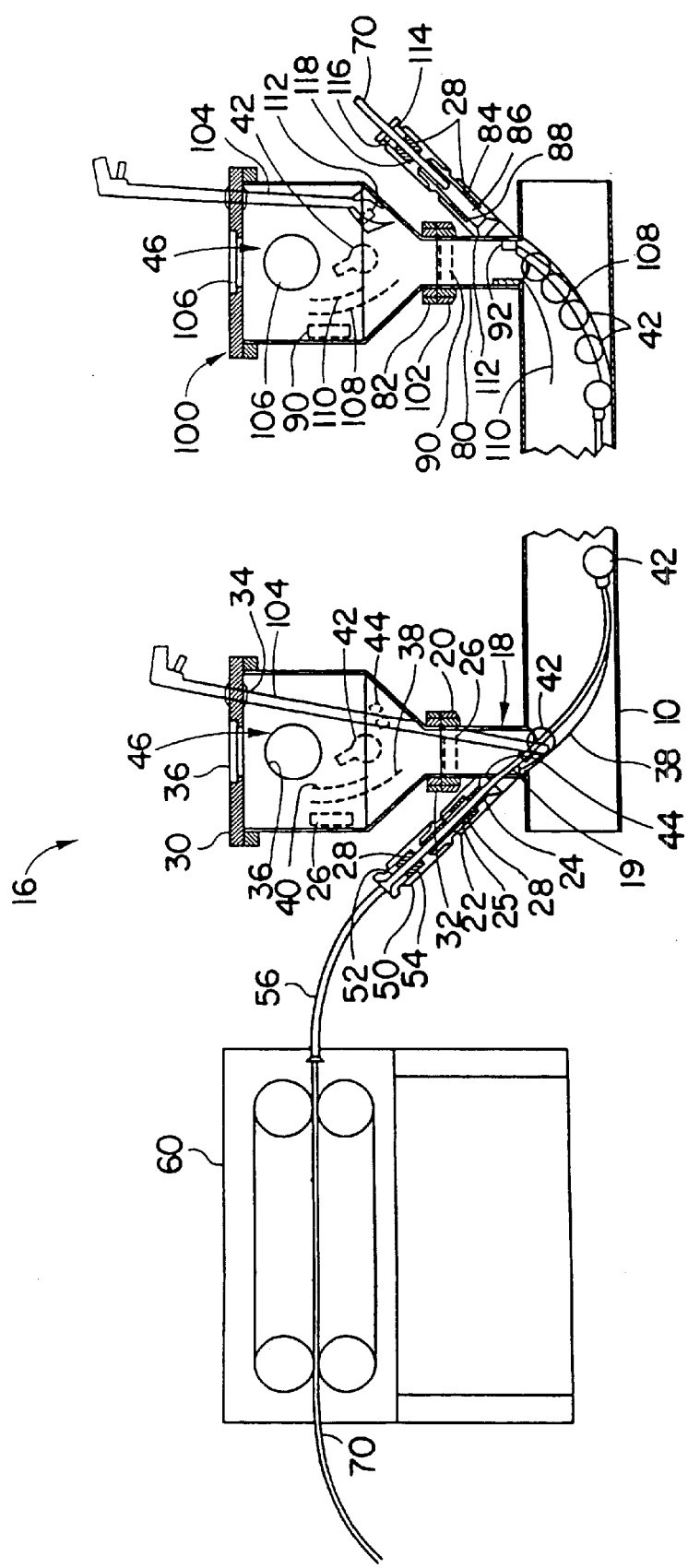
FIG. 2 is a schematic view of the system and methods of the present invention, with an installation device pushing a duct rod and guide ball through a pressurized gas pipeline.
Figure 3:
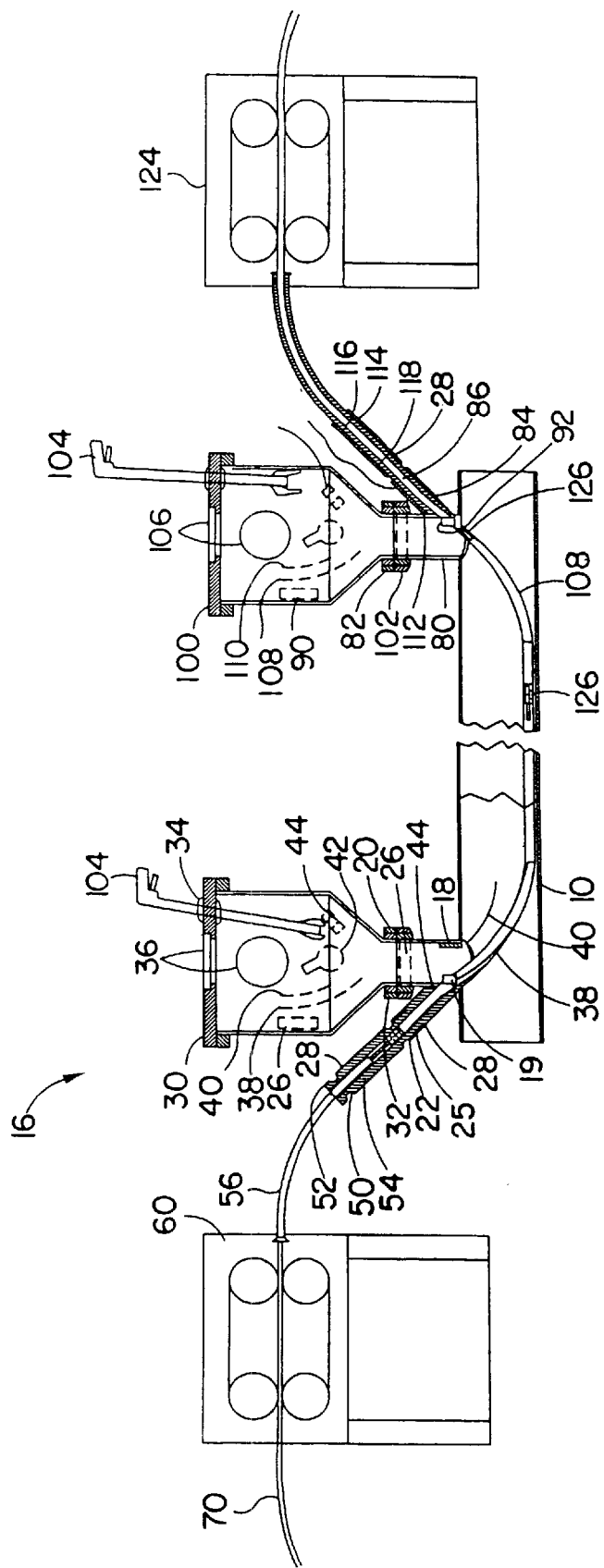
FIG. 3 is a schematic view of the system and methods of the present invention, with an installation device pulling the duct rod and fiber optic conduit back through the pressurized gas pipeline.

Referring now to FIGS. 2 and 3, a system 16 is shown for the installation of fiber optic conduit. A first access or drilling nipple 18 is attached to the exterior of the pressurized gas pipeline 10, typically by welding. The first drilling nipple 18 includes a flange portion 20 including an entry gland 22. The flange portion 20 is preferably at an angle of 30–40° to the pipeline, to clear holes while maximizing the feeding force in the direction of the pipeline, and to minimize bending of cable. The entry gland 22 and the first drilling nipple 18 connect into the interior or lumen of the pressurized gas pipeline 10. The entry gland 22 can include a bore 24 that at one end receives a split plug seal 44, if needed to temporarily seal the gland while changing fittings or packings. The entry gland 22 also includes a recess 25 for holding a temporary packing material 28 such as TEFLON (resinous fluorine polymers) or a permanent elastomer seal such as VITON (synthetic rubber). A first completion plug 26 is shown in phantom in the first drilling nipple 18. The first completion plug 26 is removable from the first drilling nipple 18 as described below. The angle of the entry/exit port and the flange portion 20 is preferably optimized to allow the maximum possible bend radius for the cable or conduit to produce the greatest amount of force in the direction of the pipe when pushing axially on the duct rod or conduit from outside the pipe.

A first pressure or air lock housing 30 is mounted to the flange portion 20 of the first drilling nipple 18, preferably via a flange and bolts 32. The first air lock housing 30 includes a interior portion or space 46 where various components and tools can be hung, placed in receivers or otherwise stored. A first manipulator 34 extends through the first air lock housing 30 into the space 46. Preferably, the first manipulator 34 includes one or more manipulator arms that can be rotated and/or extended at a wide angle from vertical within the first air lock housing 30. The first manipulator 34 is sealed against gas pressure when the first air lock housing 30 is pressurized. The first air lock housing 30 also includes viewing ports 36 in the top and side of the first air lock housing 30. The viewing ports 36 permit an operator to visually observe the interior portion of the first air lock housing 30 and first drilling nipple 18 and the internal portion of the pipeline in the vicinity where the access hole is drilled or cut.

As shown in dotted lines in FIG. 2, inside the first air lock housing 30 is the first completion plug 26, a first guide trough 38, a corner shield 40, a guide ball 42, and tapered split plugs 44. These items are movable or installable within the first air lock housing 30 via the first manipulator 34 and can be used in the installation of the fiber optic cable or conduit 8. The first guide trough 38 and the corner 40 shield are preferably coated with a low friction polymer coating such as TEFLON.

A removable packing gland 50 is engaged to and seals with the entry gland 22. The removable packing gland 50 includes a bore 52 connecting to the bore 24 of the entry gland 22. The removable packing gland 50 also includes a recess 54 for holding packing seal 28 such as TEFLON or VITON. A guide duct 56 is preferably located on an end of the removable packing gland 50 to aid in guiding the duct rod 70 through removable packing gland 50.

Still referring to FIG. 2, a first driving mechanism or rod driver 60 is located relatively near the first drilling nipple 18 and the first air lock housing 30. The first rod driver 60 provides the moving force to push and pull the duct rod 70 through the pressurized gas pipeline 10. Preferably, the first rod driver 60 is a commercial tractor feeder. The first rod driver 60 engages or grips the duct rod 70. The duct rod 70 is preferably made from a glass-reinforced composite polymer that is typically used as a snake for cable pulling. The duct rod 70 advantageously includes a polymer coating such as TEFLON or the like to aid in pushing and pulling through the pressurized gas pipeline 10. The duct rod can be any of those commercially available with a diameter that fits the dimensions of the removable packing gland 50, typically 10–12 mm OD.

FIG. 2 also shows the guide attachment, in this case a ball 42 connected to the end of the duct rod 70. The guide attachment 42 is removably connected to the duct rod 70 during the installation process if it is too large to fit through the entry/exit glands. The guide attachment 42 helps prevent the duct rod 70 from getting stuck in the pressured gas pipeline 10 from such things as burrs, slag, and the like. The guide attachment 42 preferably has an outer diameter small enough to fit through the hole drilled in the pipeline typically about 30–60 mm. The invention can be used with small diameter or larger diameter pipelines. FIG. 2 also shows the first guide trough 38 connected to the first drilling nipple 18. The connection is made via studs 19 or other suitable mans for attaching the trough in a stable manner. The first guide trough 38 is deployed from the first air lock housing 30 and helps in the introduction and removal of the duct rod 70 and fiber optic conduit 8.

Still referring to FIG. 2, a second access or drilling nipple 80 is attached to the exterior of the pressurized gas pipeline 10, typically from about 100 to 500 meters from the first nipple. The second access or drilling nipple 80 includes a flange portion 82 and an exit gland 84. The exit gland 84 in the second drilling nipple 80 connects with the interior of the pressurized gas pipeline 10. The exit gland 84 includes a bore 86 tapered at one end for receiving split plugs 112. The exit gland 84 also includes a recess 88 for holding a packing material 28. A second completion plug 90 is shown in dotted lines in the second drilling nipple 80. The second completion plug 90 is removable from the second drilling nipple 80.

A second air lock housing 100 is mounted to the flange portion 82 of the second drilling nipple 80, preferably via bolts 102. The second air lock housing 100 also includes an interior portion or space 46 where various components and tools can be stored. A second manipulator 104 extends into the interior space 46 of the second air lock housing 100. Preferably the second manipulator 104 includes a manipulator arm that can rotate and/or extend at a wide sweep of angles from vertical within the second air lock housing 100. The second manipulator 104 is sealed against the gas pressure when the second air lock housing 100 is pressurized. The second airlock housing 100 also includes viewing ports 106 in the top and side of the second airlock housing 100. The viewing ports 106 permit an operator to visually observe the interior portion of the second air lock housing 100 and to see into the pipeline.

As shown in dotted lines in FIG. 2, the second completion plug 90, a second guide trough 108, a corner shield 110, a guide ball 42, and tapered split plugs 112 are stored inside the second air lock housing 100. These items are moveable/installable within the second air lock housing 100 via the second manipulator 104.

A second removable packing gland 114 is engaged to and sealed with the exit gland 84. The second removable packing gland 114 includes a bore 116 connecting with the bore 86 of the exit gland 84. The second removable packing gland 114 also includes a recess 118 for holding packing material 28.

Referring now to FIG. 3, a second rod driver 124 is positioned near the second drilling nipple 80 and the second air lock housing 100. The second driving mechanism 124 feeds the fiber optic cable or conduit 8 into the pressurized gas pipeline 10 via the second removable packing gland 114. Preferably, the second driving mechanism 124 is a commercial tractor feeder. A guide duct 120 is advantageously located on an end of the second removable packing gland 114 to aid in guiding fiber optic conduit 8 through the second removable packing gland 114. Both rod drivers can push or pull the rod, fiber optic cable or conduit as required.

Referring back to FIG. 2, the second guide trough 108 is shown in its deployed configuration, wherein the second guide trough 108 is positioned by attaching to pipeline 10 or second drilling nipple 80 via studs 92 or another suitable mechanism. The second guide trough 108 aids in the removing and installing the duct rod 70 and fiber optic cable or conduit 8 into the pressurized gas pipeline 10. A cross-sectional view of the second guide trough 108 is shown in FIG. 4. The second guide through 108 is preferably coated with a low friction polymer coating such as TEFLON. As shown in FIG. 2, a second corner shield 110 is also shown in the deployed state. The second corner shield 110 helps prevent the duct rod 70 and fiber optic cable or conduit 8 from getting stuck or being abraded or cut during installation. Preferably, the second corner shield 110 is also coated with a low friction polymer such as TEFLON. Teflon coating the guide trough and corner shields reduces drag when installing cable, conduit or rod.

The guide troughs support the cable, conduit or rod to prevent kinks at the infeed end. They centralize and guide the cable, conduit or rod on the outfeed end. The corner shields protect the cable, conduit, or rod from abrasion and gouging caused by the rough machined edges of the drilled holes.

With reference to FIGS. 2 and 3, showing the system installed, in an overview of the method of introducing the fiber optic conduit 8 into the pressurized gas pipeline 10, generally the duct rod 70 is initially introduced into the pressurized gas pipeline 10 via an entry port in the first access or drilling nipple 18. The entry port preferably extends through the gland 22 and the first removable packing gland 50. However, the entry port can also include just the entry gland 22.

After the corner shields and troughs (if used) are deployed within the first air lock housing 30, the duct rod 70 is advanced through the pressurized gas pipeline 10. Corner shields and troughs are optionally also deployed and removed in the second air lock housing 100. The duct rod 70 then exits the pressurized gas pipeline 10 via an exit port in the second drilling nipple 80. The exit port preferably includes the exit gland 84 and the second removable packing gland 114. However, the exit port can include just the exit gland 84. A fiber optic cable or conduit 8 is then attached to the end of the duct rod 70. The duct rod 70 and the fiber optic conduit 8 are then pulled back through and out of the pressurized gas pipeline 10. The duct rod is preferably rewound onto a spool for reuse at the next segment of pipeline. The conduit can be joined to the next adjacent segment of conduit or left open for customer connection once a fiber optic cable is installed within the conduit using conventional installation techniques. With conduit installed and sealed at both ends, cable can be installed at a later date when convenient.

Turning now in detail to the system and methods of the invention, the installation begins by attaching (e.g., welding) the first drilling nipple 18 to the pressurized gas pipeline 10. The first removable packing gland 50 is installed in the entry gland 22. The leading end of the duct rod 70 is then inserted into the first removable packing gland 50 and the entry gland 22 to aid in sealing off pressurized gas. A drilling machine designed for drilling operations under gas pressure, such as a Mueller C-136 or similar drilling machine, is attached, e.g., bolted and sealed onto the drilling nipple. The pressurized gas pipeline 10 is then drilled via a drilling or cutting machine 250 (shown installed in FIG. 6). The slug is removed from the pressurized gas pipeline 10 and the first drilling nipple 18 is sealed with the first completion plug 26. The first air lock housing 30 is then mounted to the first drilling nipple 18 via bolts 32. Use of drilling nipples and drilling machines on pressurized pipelines is well known. Other commonly known techniques for creating an opening into the pipeline may also be used.

Using the viewing ports 36, an operator then uses the first manipulator 34 to substantially equalized the pressure in the first air lock housing 30 with the pressurized gas pipeline 10. The first completion plug 26 is removed and stored within the first air lock housing 30 via the manipulator 34. Next, the first guide trough 38 is deployed using the first manipulator 34. The first guide trough 38 is mounted to the studs 19. The end of the duct rod 70 is slowly fed into the nipple 18. The guide ball 42 is attached on the end of the duct rod 70 via the first manipulator 34. The guide ball 42 and the duct rod 70 are then pushed down the first guide trough 38 and through the pressurized gas pipeline 10. The first driving mechanism 60 provides the force needed to push the duct rod 70 and guide ball 42 along the pressurized gas pipeline 10. A dry lubricant may be added to the exterior of the duct rod 70 before it enters gland 50. Gas leakage is minimized by the glands and seals.

The second air lock housing 100 is installed in a similar manner as described above for the first air lock housing 30. The second drilling nipple 80 is attached to the pressurized gas pipeline 10. The second removable packing gland 114 is installed in the exit gland 84. A short piece of duct rod 70 is then inserted into the second removable packing gland 114 and secured to aid in sealing off the pressurized gas. The pressurized gas pipeline 10 is then drilled or otherwise opened up within the second drilling nipple 80. The slug is removed from the pressurized gas pipeline 10 and the second drilling nipple 80 is sealed with the second completion plug 90. The second air lock housing 100 is then mounted to the second drilling nipple 80 via bolts 102.

Using the viewing ports 106, an operator then uses the second manipulator 104 to substantially equalize the pressure in the second air lock housing 100 with the pressurized gas pipeline 10. The second completion plug 90 is removed and stored within the second air lock housing 100 via the manipulator 104. Next, the second guide trough 108 is deployed using the second manipulator 104. The second guide trough 108 is mounted on studs 92. The second air lock housing 100 can be installed on the pressurized gas pipeline 10 either before, after, or during the installation of the first air lock housing 30.

The shape of the second guide trough 108, as shown, for example in FIG. 4, leads the advancing guide ball 42 and duct rod 70 into the second drilling nipple 80. The first guide trough 38 may also have this same profile. When the guide attachment 42 is part way up the second guide trough 108, the operator uses the second manipulator 104 to remove the guide attachment 42 and store the guide attachment 42 in the second air lock housing 100. The end of the duct rod 70 is then slowly advanced into the exit gland 84, if necessary with the help of the second manipulator arms, and pushes out the short piece of duct rod 70 that was sealing the second removable packing gland 114. Split plugs 44, 112 can be inserted from the inside of the first and second drilling nipples 18, 80 via the first and second manipulators 34, 104 to seal the system while the glands are arranged to pull the duct rod 70 and/or fiber optic conduit 8 through the pressurized gas pipeline 10.

With the duct rod 70 now pushed outside the exit gland 84, the fiber optic cable or conduit 8 is connected to the end of the duct rod 70, preferably via a cable grip 126 attached to the end of the duct rod 70. Once the duct rod 70 and the cable grip 126 are connected, the split plugs 112 are removed via the second manipulator 104. The first driving mechanism 60 then reverses direction and begins to pull the duct rod 70 and fiber optic conduit 8 back through the pressurized gas pipeline 10. At the same time, the second driving mechanism 124 feeds the fiber optic conduit 8 into the guide duct 120. The duct rod 70 is pulled at the same speed that the fiber optic conduit 8 is fed into the pressurized gas pipeline 10. A lubricant may be added to the exterior of the fiber optic conduit 8.

Alternatively, the duct rod at the entry can be pulled through to the end of its roll, and the fiber optic cable or conduit attached at the entry and pulled through the pipe from that point to the exit location. This approach allows the rod to be coiled at the exit location and be closely located to the next pipeline segment entry location. This facilitates multiple segment installations.

The first removable packing gland 50 is then sized to permit passage of the cable grip 126 such that the entry gland 22 (which will now be used as an exit gland since the duct rod 70 and fiber optic conduit 8 are being pulled in the opposing direction) can seal on the exterior of the cable grip 126 and fiber optic conduit 8. The duct rod 70 and fiber optic conduit 8 are then pulled out the first drilling nipple 18 into a final position. Once the duct rod 70 and fiber optic conduit 8 are in the final position, the tapered split plugs 44, 112 are placed into position using the first and second manipulators 34, 104. The first and second removable packing glands 50, 114 are then removed along with any packing material 28 and final split plug seals are installed.

The entry gland 22 and the exit gland seals 84 are finally secured and further sealed via a threaded nut 352 and service head adapter with shield nut 360 (shown in FIG. 15 and described below). The first completion plug 26 and the second completion plug 90 are retrieved and installed in the first and the second drilling nipples 18, 80 using the first and second manipulators 34, 104, respectively. The pressure is reduced in the first air lock housing 30 and second air lock housing 100 and the first and second air lock housings 30, 100 are removed from their respective flanges 20, 82.

The fiber optic conduit 8 containing fiber optic cable is now installed in the pressurized gas pipeline 10. The method and device are capable of installing fiber optic conduit 8 into pressurized gas pipelines 10 without stopping or impeding the flow of natural gas. In this manner, existing pressurized gas pipelines 10 can be installed with fiber optic conduit 8 without disruption in gas service to customers.

Figure 5:
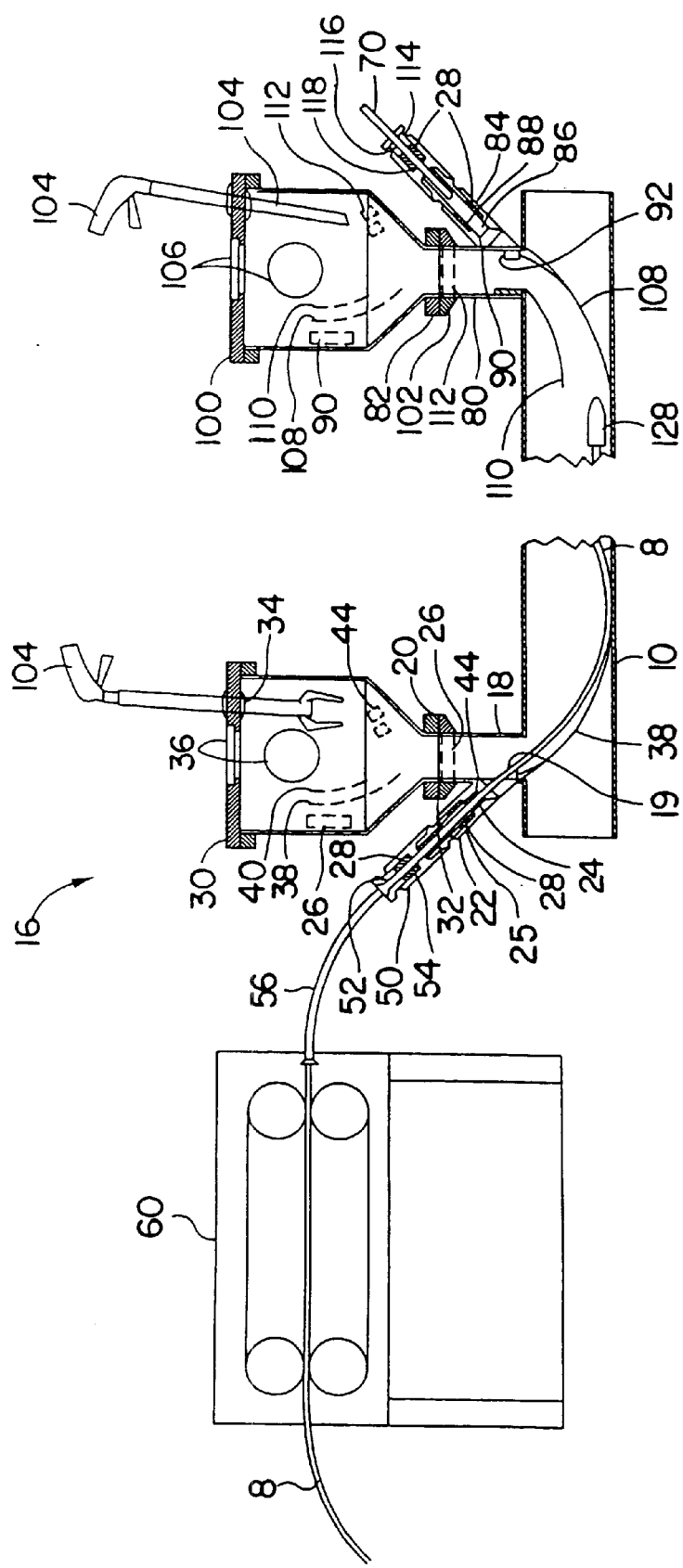
FIG. 5 is a side view of the installation device according to alternative embodiment of the invention.

In an alternative embodiment of the invention, shown in FIG. 5, the duct rod 70 is replaced with semi-rigid fiber optic or other conduit 8. A bull nose or bullet head 128 may be located on the end of the conduit 8 and allows the fiber optic conduit 8 to be pushed through the glands 22, 84 and pressurized gas pipeline 10 without the need for a separate duct rod 70 or for a rodding gland assembly 50, 118. As with the prior method, the drilling nipples 18, 80 and the first and second air lock housings 30, 100 would also be employed. The guide attachment 42, however, would not be needed. In this aspect of the invention, the fiber optic conduit 8 needs to be sufficiently rigid to permit the snaking of the fiber optic conduit 8 through the pressurized gas pipeline 10 for distances anticipated to be found between customer connection locations in metro environments. For example, the fiber optic conduit 8 can include one or more reinforcing layers wrapped around a central core conduit or, a duct rod can be inserted into the conduit. Alternatively, the fiber optic conduit 8 can be made of a composite polymer that has sufficient rigidity such that the fiber optic conduit 8 can be snaked through the pressurized gas pipeline 10. Pressurizing the conduit with compressed gas is another option for increasing the conduit rigidity.

Figure 6:
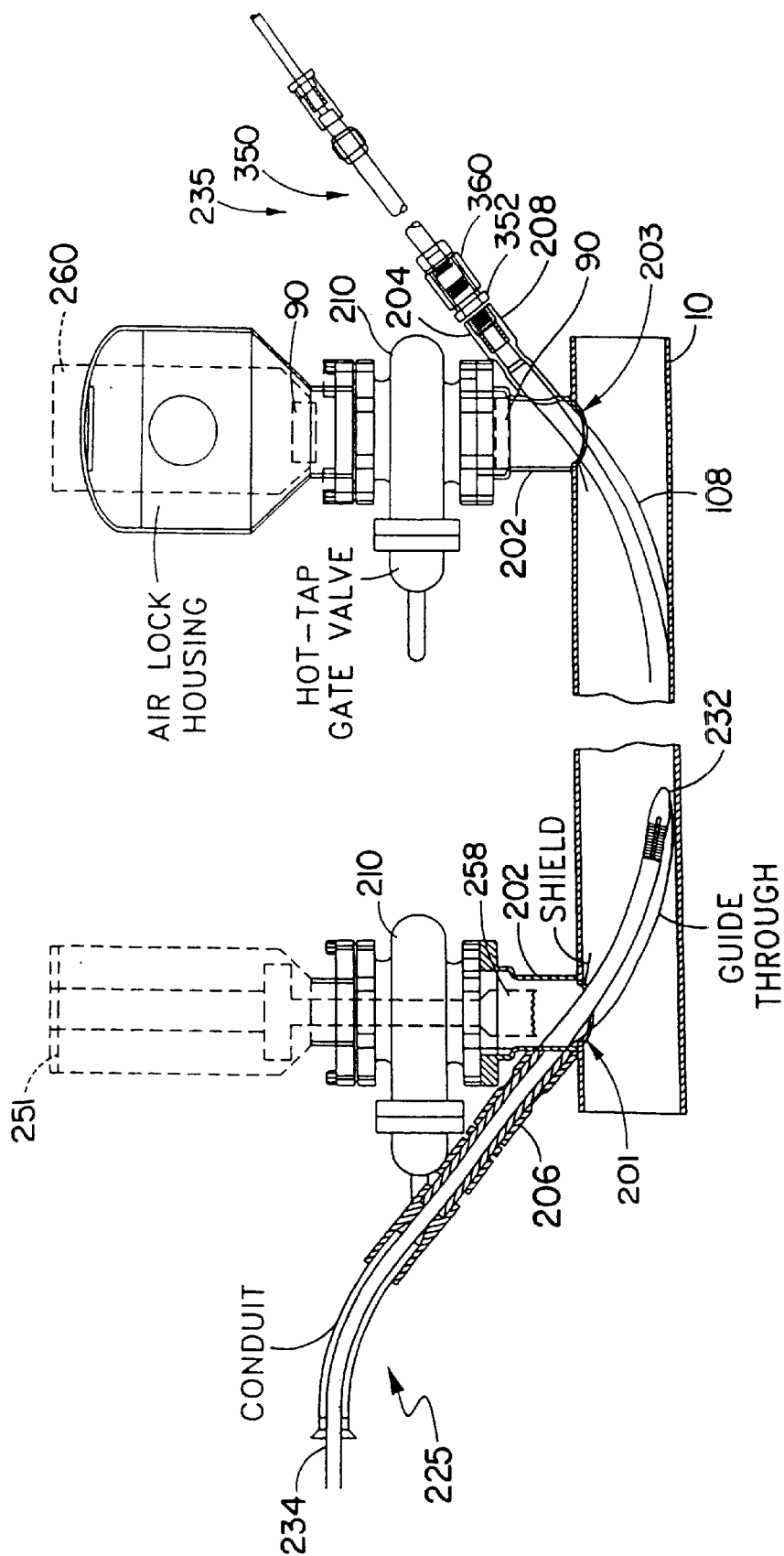
FIG. 6 is a schematic view of an another alternative system and method for installing conduit directly.

Referring now to FIG. 6, in an alternative system and method, standard "hot-tap" drilling nipples 202 are modified with a side arm 204 containing packing glands 208 at their outer ends. The nipples 202 are located in position on the gas pipeline 10 and welded in place. A gate valve 210 and drilling machine 250 are attached to the drilling nipple 202. The valve 210 is opened. The drilling machine 250 extends a cutter 252 through the open valve and cuts a hole in the pipeline, within the drilling nipple 202. The cutter 252 is withdrawn back out through the open valve, and the valve is then closed. The drilling machine 250 is then removed (e.g., unbolted) leaving the gate valve in place. The air lock housing 30 is attached to the gate valve and the valve opened, giving access to the pipe through the air lock housing 30.

After the fiber optic cable or conduit installation is complete, the gate valve is closed, the air lock housing removed and a completion or stopping machine 260, such as a Mueller H-17235 or equivalent, is attached and sealed onto the drilling nipple, preferably via bolts. The completion machine 260 holds the completion plug 26 or 90. The valve is opened and the completion plug 26 or 90 is installed into the upright neck of the drilling nipple and tightened using the completion machine 260. The completion machine 260 and gate valve are removed and a blind flange is installed over the nipple.

Figure 7:
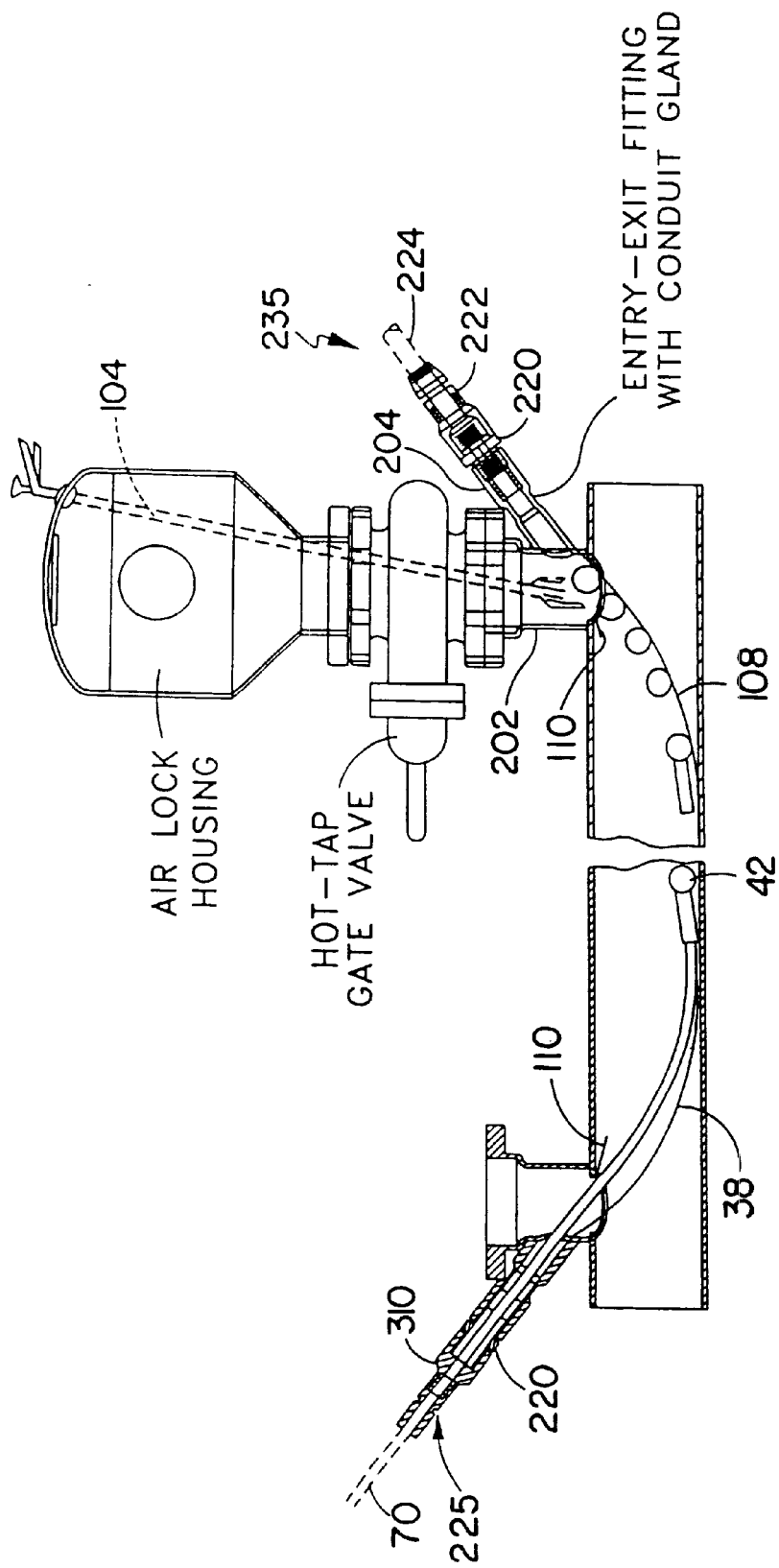
FIG. 7 is a schematic view of another method and system using a guide rod to pull cable or conduit back through a pipeline.

Referring to FIG. 7, when duct rodding is used, the following steps are preferably performed:

1. Before drilling the hole in the pipeline, conduit gland nut 222 or 352 and a rodding adapter gland nut 222 are attached to the entry/exit fitting 204 on the drilling nipple 202. On the infeed end 225, the rod 70 is inserted through the glands, and the rod guide attachment 42 is attached to the rod 70. The rod attachment is retracted into the recess at the inner end of the entry/exit fitting if its size detrimentally blocks the pipe entry hole 203. On the outfeed end 235, a short length of rod 224 is inserted into the rodding adapter 222 to act as a temporary plug.

2. Holes are cut in the pipeline. The air lock housings are attached as explained above.

3. Using the manipulator 34, 104, the guide troughs 38, 108 and corner shields 110 are installed from inside the air lock housings.
4. The rod 70 is pushed until the guide attachment 42 is at the top of the trough 108 at the outlet end 235. Alternatively, if no guide trough is used, the manipulator arms can be used to grasp the guide rod and maneuver it into the exit gland. Using the manipulator 104, the guide ball is removed and the rod is guided into the entry/exit fitting 204. Alternatively, the duct rod 70 is attached to the short piece of duct rod that was pre-installed in the exit gland. Once attached, the pre-installed rod piece 224 can be used to pull the duct rod 70 through the exit. In some applications, the duct rod or conduit may be snaked or driven through by hand, especially on shorter runs.
5. The rod is pushed through the glands, pushing out the plug 224.
6. By attaching a fiber optic or other type cable or a conduit to either end of the rod, installation can proceed with forward or backward direction by pushing and/or puling the duct rod.
7. Split rubber plugs can be installed in the recesses at the inner ends of the entry/exit fittings using the manipulator to control leaking until the proper seal packing is installed in the glands.
8. Completion plugs area installed. The air lock housings and valves are removed, as explained above.

Figure 8:
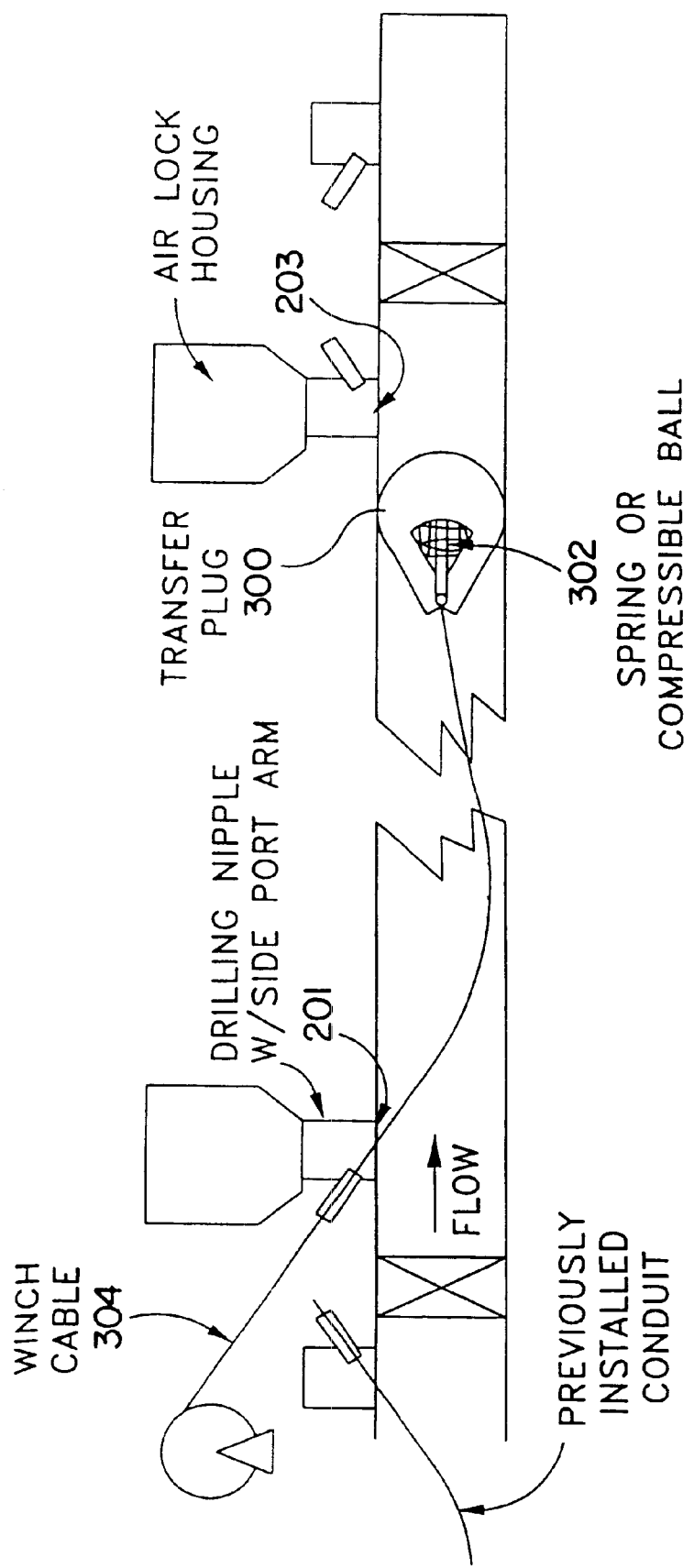
FIG. 8 is a schematic diagram of a transfer plug embodiment.

In place of the driving apparatus 60 and 124, in an alternative design shown in FIG. 8, a transfer plug 300 is installed into and removed from the pipeline via the air lock housings. The transfer plug 300 has a spring-like frame 302 which causes it to pop open after it is pushed through the entrance hole 201 cut into the pipeline. Alternatively, the transfer plug can be constructed with a solid, compressible core with a "memory" shape similar to the pipeline cross section. Preferably, the parachute has a diameter just slightly less than the pipeline diameter. A draw cable, rope, or wire 304 is attached to the transfer plug 300. The gas flowing through the pipe carries or blows the parachute 300 from the first drilling nipple to the second drilling nipple, where it is extracted through the exit hole 203, using the manipulator. The draw cable 304 is separated from the transfer plug and is pulled through the exit glands using an extractor hook 306 on the end of a piece of duct rod 70. The back end of the draw wire 304 is attached to a cable or conduit. By pulling on the draw wire 304, the cable or conduit is pulled through the pipeline. Hence no duct rod is needed to route the conduit through the pipeline in this embodiment. In certain applications, compressed air may be used to blow the transfer plug 300 through the pipeline, instead of the gas. In routing or passing conduit through the pipeline, the conduit may be stiffened, by filling it with compressed gas, or by placing a stiffening element or material in the conduit. The stiffened conduit is easier to route.

Figure 13:
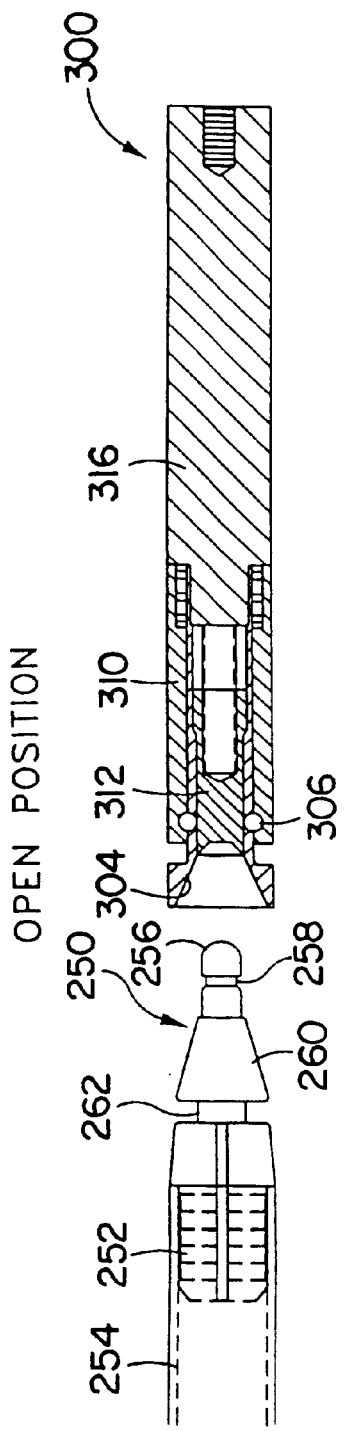
FIG. 13 is a section view of an end coupler aligned for engagement with the conduit end shown in FIGS. 9–12.
Figure 14:
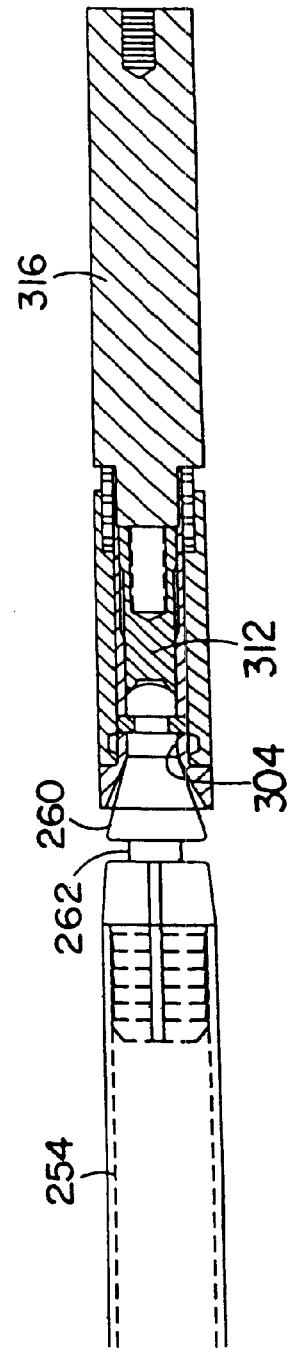
FIG. 14 is a section view of the end coupler and conduit end of FIG. 13 coupled together.

FIGS. 9–12 show an alternative design having an end plug 250 having grip rings 252 which secure it into the open end of a conduit 254. The end plug 250 preferably also has a spherical end nose 256, a coupler groove 258, a conical guide collar 260, and a neck 262, as shown in FIG. 13. A manipulator 270 on a fitting 271 attached to the pipeline has a hand 272 adapted to close around the neck 262. The hand 272 is supported on an armature 274 attached to the lower end of the manipulator 270 at a pivot joint 276. A linkage 278 on the armature 274 extends up through or near the armature 274, so that the hand 272 can be pivoted up at an angle, as shown in FIG. 12, by controlling the manipulator handles, outside of the air lock.

A coupler 300 is positioned into a neck 302 of the fitting 271. The coupler has a receptacle 304 adapted to couple onto the end plug 250. The receptacle has a coupling ring 306 slightly smaller than the end nose 256. The receptacle has a conical guide 308 adapted to cooperate with the guide collar 260, to guide the coupler groove 258 into engagement with the coupling ring 306. The receptacle 304 is slidably positioned within a collar 310. A center rod 312 is threaded onto a rod extractor segment 316 which is sealed against the neck 302 by glands 314.

In use, the end plug 250 is maneuvered into position under the manipulator 270. The neck 262 is grabbed by the hand 272, as shown in FIG. 10. Using the linkage 278, the end plug 250 and attached conduit is tilted up into alignment with the coupler 300 in the neck 302. The collar 310 and receptacle 304 is pushed into engagement with the end plug 250. The coupling ring 306 snaps into place around the coupler groove. The end plug 250 and attached conduit can then be pulled out of the neck 302 by pulling on the extractor segment.

Referring to FIGS. 6 and 9–15, if conduit is to be installed directly, the following steps are preferably performed:
1. Before drilling the hole in the pipeline, the conduit gland nut 220 is attached to the entry/exit fitting. The conduit nose fitting 250 is installed on the end of the conduit 254 and pushed into the conduit gland to seal it. A coupler 300, as shown in FIGS. 9 and 13, is inserted into the exit port gland 204 and gland nut 220, shown in FIG. 6.
2. The hole is drilled in the pipeline and the valve and the air lock housing are attached as explained above.
3. Using the manipulator 270, the corner shields 400 are installed into the pipeline from inside the air lock housing, as shown in FIG. 19.
4. The conduit 254 is pushed through until the nose fitting 250 is reachable by manipulator arm 270 at the exit end 235. The manipulator 270 is used to attach the nose fitting 250 to the coupler 300. FIG. 9 shows detailed examples of the manipulator, nose fitting and coupler fittings and how they function as a system.
5. The coupler 300 is used to pull the conduit 254 through the exit gland 204 and gland nut 220
6. A completion plug is installed. The air lock housing and valves are removed as explained above.
7. The conduit 234 is now sealed to the pipeline 10 using a modified service head adapter with shield nut 226, but the interior of the conduit is still open. After the cable is installed in the conduit, it is preferably sealed to the conduit, either at the entry/exit fitting or at a remote end of the conduit. An assembly of appropriate glands will provide the seal in either case.

The guide troughs, guide ball, and corner shields may be omitted or replaced with functional equivalents.

Turning to FIG. 15, a conduit or other lumen 348 is sealed within a side arm 350 of a pipeline fitting, to prevent escape of pressurized gas. As shown in FIG. 15, a gland nut 352 is threaded into the side arm 350 via machine threads 363. An O-ring 356 at a shoulder 355 on the gland nut 352, and a packing assembly 354 within the side arm 350, provide a pressure tight seal between the gland nut 352 and the side arm 350. The packing assembly 354 also seals against the outside diameter of the conduit 348. The packing assembly includes a stack up of washers, packings, and split opposite packings.

A shield nut 360 is attached to the gland nut 352 via pipe threads 362. A fusion socket reducer 358 surrounds the outside diameter of the conduit 348, within the gland nut 352 and shield nut 360. A pipe section 368 is threaded into the outer end of the shield nut 360, and is sealed against the shield nut 360 by an annular rubber seal 364. A pipe section 370 extends from the pipe section 368, through the shield nut 360 and into the fusion socket reducer 358. A pipe section stiffener 366 is optionally provided within the pipe section 370.

With the design shown in FIG. 15, a pressure tight seal is formed around the conduit 348, without constricting the internal diameter or lumen of the conduit 348. This allows for sufficient installation of fiber cable into the conduit using compressed air.

Turning now to FIGS. 16–19, a corner shield 400 has a pair of arms 402 extending outwardly at an angle from a center clip 408. Each of the arms 402 has a top flange 404 and a side flange 406. A flanged rivet 410 is attached to the clip 408. The clip 408 is adapted to clip onto the edge of a drilled pipeline, as shown in FIG. 19. The flanged rivet 410 is adapted to be grabbed by a hand of a manipulator, such as the hand 272 of the manipulator 270 shown in FIGS. 9–12.

In use, the corner shield 400 is preferably stored within an air lock housing, as described above. The manipulator 270 picks up the corner shield 400 by engaging or grabbing onto the flanged rivet 410 using the manipulator hand, such as the hand 272. The corner shield 400 is then installed onto the edge of the opening, as shown in FIG. 19, using the manipulator 270. The clip 408 holds the corner shield 400 onto the pipeline, via spring force. The corner shield 400 prevents the cable or conduit moving into or out of the pipeline from chaffing or scrapping on the opening drilled into the pipeline.

While the system is preferably used on pipelines of about 10 cm or larger, it may also be used on smaller lines, with modified drilling nipples.

The system and methods may also be used with other types of pressurized pipelines, including pipelines carrying liquids, with appropriate modifications of the seals and glands.

Multiple, interchangeable packing glands allow use of the same entry/exit fitting with many sizes of cable, conduit or rod.

Multiple layers of split packing materials allow changing seals with the cable, conduit, or rod in place.

The duct rod or conduit (with or without stiffening devices) acts as a translating member, i.e., an element that is moved through the pipeline.

Nominal gas leakage may of course occur in using the present system and methods, without affecting the advantageous results. The description herein of sealing, seals, pressure tightness, etc. and steps performed without allowing gas to escape, of course contemplate and include situations where nominal leakage occurs.

If suitably strong manipulators are used, the gate valve is not needed and the air lock housing can be mounted directly to the drilling nipple, as shown in FIGS. 2 and 3. After equalizing pressure, the completion plug could be removed with the manipulator and stored inside the air lock housing.

The attachment of components described above are made pressure-tight, to prevent gas from escaping form the pipeline, using known seals, components and methods, except as specified.

Figure 20:
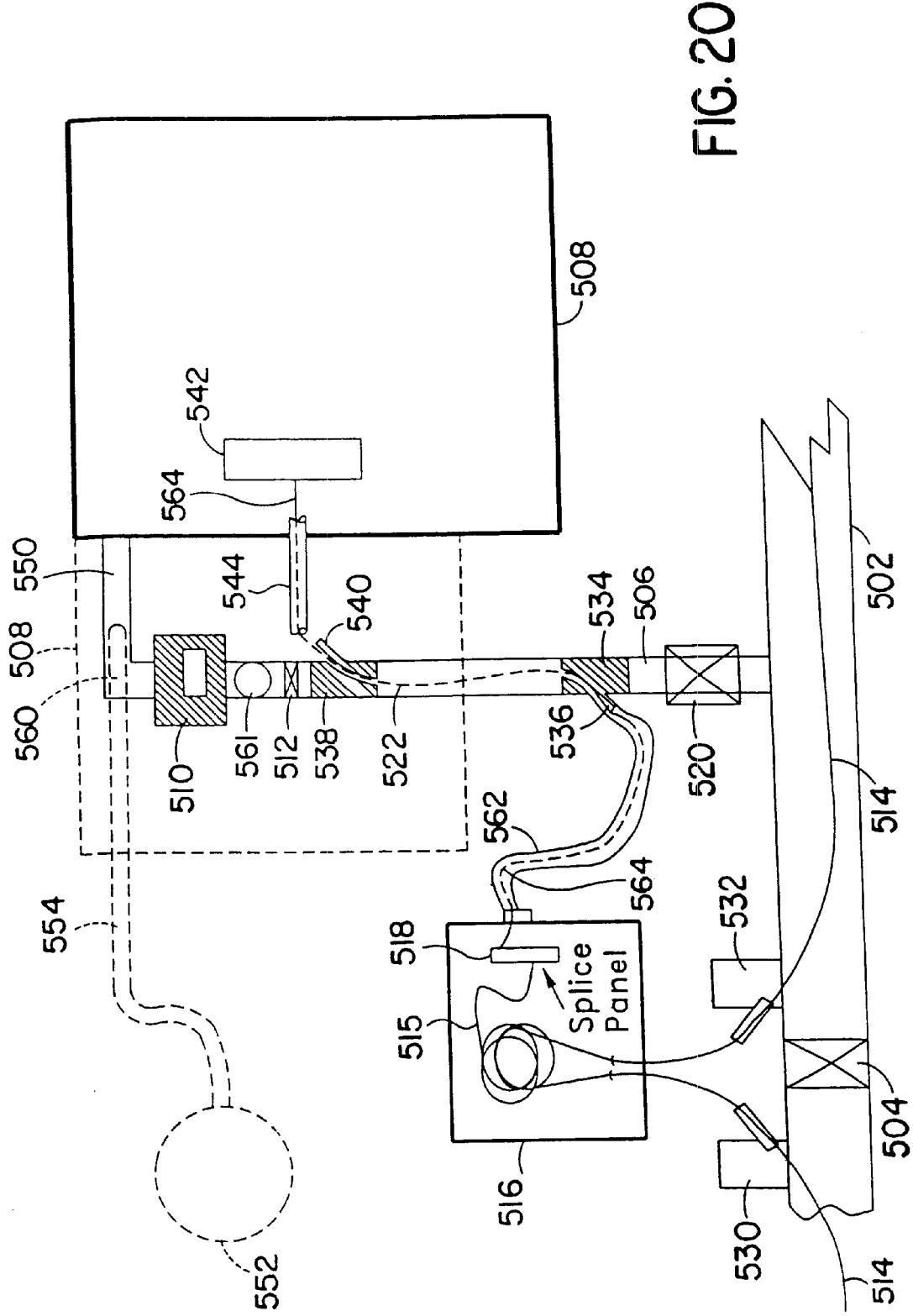
FIG. 20 is a schematic drawing of a service line conduit installation method.

FIG. 20 illustrates a method for connecting a cable or conduit running through a gas pipeline or main into a building. As shown in FIG. 20. A cable or conduit 514 is routed through a pipeline 502 as described above with reference to FIGS. 1–12. The cable 514 is withdrawn or routed out of the pipeline 502 at an outlet port 530, through a junction box or vault 516, and then back into the pipeline 502 at a return port 532. The outlet and return ports, and the methods for routing through them, may be as described above with reference to FIGS. 1–3, 5, 9–12 and 15. A patch line 515, which may be one or more optical fiber strands, from the cable 514 is connected into a patch panel or splice connector 518, within the junction box 516. A branch line cable 522 is routed from the patch panel 518 to a natural gas or other utility service line 506. The service line 506 is a pipe connecting from the main pipeline 502 into a building 508.

To route the branch line cable 522 into the building 508, the gas supply through the service line 506 is temporarily bypassed. This bypassing is preferably achieved by connecting a temporary gas supply 552 to the customer houseline or customer line inlet 550, via a temporary hose 554 equipped with standard bypass fitting 560. The temporary gas supply 552 can be from a portable tank of gas or from another pipeline source. If a temporary gas supply 552 is used, it preferably contains enough gas to continuously supply gas to the building 508, during the cable installation procedure.

After the temporary gas supply 552 is connected, the service line 506 is isolated by closing the normally open service line valve 520 or using a variety of other conventionally available gas control techniques, such as temporary line pinching. The bypass fitting 560 prevents gas from flowing backwards to the meter and into the service line. This shuts off supply of gas from the main 502 into the service line 506, and also isolates the meter 510 and the temporary supply line 554 and/or the building inlet 550 from the service line. Gas supply to the building 508 continues via the temporary gas supply 552. In some applications where interrupting the gas supply to the building for a short time is acceptable, installation and use of the temporary gas supply may be omitted. The meter 510, valve 512, regulator 561 and inlet 550 may be located inside of the building, as shown in dotted lines in FIG. 20.

Gas in the service line between the valves 520 and 512 is removed and replaced with an inert gas such as nitrogen. This is typically achieved by "blowing down" the service line. The service line is vented to the atmosphere and compressed inert gas is injected or blown into the service line, to purge the natural gas out of the service line 506.

First and second access fittings 534 and 538 are then installed into the service line 506. As this procedure is performed with the service line depressurized, purged with nitrogen or another inert gas, and then filled with air, no special containment techniques are needed. The service line 506 is cut near the junction box 516 or the valve 520 to install the first access fitting 534. The service line is also cut near the valve 512 or at another location near the building 508, to install the second access fitting 538. The second fitting 538 is typically installed in place of the original valve 512 location. The valve 512 is then re-installed down stream of the second fitting. Alternatively, the second fitting 538 can be installed below ground in a vault.

A building access conduit or duct 544 is installed extending from the building 508 to near or into the second fitting 538. The access conduit 544 typically is installed in the basement of the building 508 and runs out from under the building to the access fitting 538 on the meter-set-assembly riser pipe location adjacent to the building 508. Alternatively, when the access fitting 540 is located in a vault below ground, the access conduit 544 will connect at that location.

A service line access conduit 562 is routed from the junction box 516, typically via a bore hole, to the entry access fitting 534. The service line conduit 522 is then routed, by hand or by use of a duct shuttle, from the termination of the service line access conduit 562 into the service line 506 via the side branch 536 of the first access fitting 534. The service line conduit 522 is then further routed, also preferably by hand or duct shuttle, out of the service line 506, via the side branch 540 of the second access fitting 538. The service line conduit 522 is then sealed to the service line access fitting side branches 536 and 540 with gas-tight seals, preferably electro-fusion reducer couplings 563. Alternative seals, such as glands, pressure fittings, etc., may also be used. Optical fiber cable 564 is then installed through the service line access conduit 562, the service line conduit 522 within service line 506, and the building access conduit 544. Water, dust and air seals are placed in both ends of the service line access conduit 562, the service line conduit 522, and the building access conduit 544. The fiber cable is then spliced to the splice panel 518 and to the building telecommunication distribution junction panel 542.

Various telecommunication devices within the building 508, such as personal computers, data servers, telephones, etc. are connected to the branch line cable 564 via electronics. The connection between such devices in the building 508 and the trunk optical fiber cable 514 in the gas main 502 is now complete. Alternatively, the trunk cable can be installed via any host of traditional methods, including via direct burial in conduit.

Service line 506 is tested for leaks, and air, if present, is purged out of the service line with an inert gas, after which natural gas is introduced by opening valve 520 or releasing any applicable pinch closure. Once the line is purged of any inert gas, the bypass fitting 560 is removed and the bypass access nut re-installed. Any excavation created around fittings 534 and 538, is filled in. The entire installation is now complete. This method is advantageous as it provides a relatively simple, fast and inexpensive way to provide telecommunication services via a cable in gas pipelines. The delays, costs, and inconvenience of extensive excavation for routing cables is avoided. Use of the access conduit 562 may be omitted.

Figure 22:
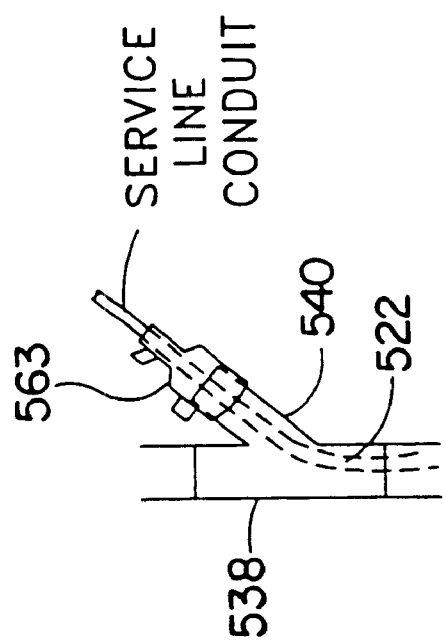
FIG. 22 is a detail of a fitting shown in FIG. 20.
Figure 21:
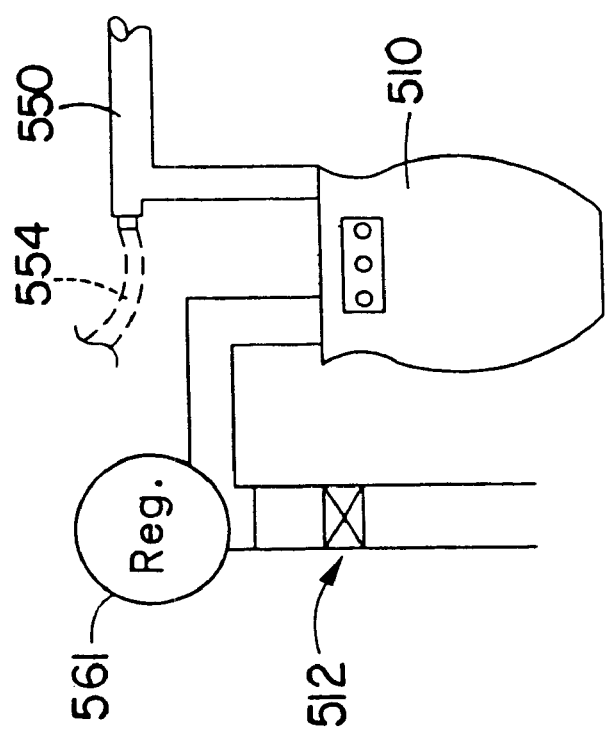
FIG. 21 is a detail view of the regulator and meter shown in FIG. 20.

FIG. 21 better shows the typical positions of the meter 510, regulator 561, and the customer houseline 550. FIG. 22 shows an electro-fusion reducer coupling 563 on the side branch 540 of the fitting 538.

While embodiments of the present invention have been shown and described, various modifications may be made without departing from the scope of the present invention. The invention, therefore, should not be limited, except to the following claims, and their equivalents.

What is claimed is:

1. A method for connecting a primary cable or conduit extending through a gas main pipeline into a building, via a service line connecting the gas main pipeline into the building, comprising the steps of:
    closing off the service line from the main pipeline at a first location;
    purging gas from the service line downstream from the first location;
    installing first and second cable fittings into the service line after purging the gas from the service line;
    connecting a branch line cable to the primary cable;
    routing the branch line cable through the first fitting, into the service line;
    routing the branch line cable through the service line to the second fitting;
    routing the branch line cable through the second fitting and out of the service line;
    routing the branch line cable from the second fitting into the building;
    sealing the first fitting and the second fitting around the branch line cable, to prevent gas leakage at the first and second fittings; and
    re-opening up the service line to the main pipeline.

2. The method of claim 1 where the service line is closed off from the main pipeline by closing a service line valve positioned between the main pipeline and the first fitting or by pinching the service line.

3. The method of claim 1 where gas is purged from the service line by introducing compressed air into the service line adjacent a first end of the service line, and venting a second end of the service line.

4. The method of claim 1 where the service line extends into a gas meter valve, and the second fitting is adjacent to the gas meter valve.

5. The method of claim 4 further comprising the step of connecting a temporary gas source into the service line, at a location between the building inlet and the gas meter valve.

6. The method of claim 1 where the first and second fittings are sealed via fusion or pressure fittings.

7. The method of claim 1 further including the steps of withdrawing the primary cable from the main pipeline and into a junction box, connecting the branch line cable to the primary cable at the junction box, and routing the primary cable back into the main pipeline.

8. The method of claim 1 further comprising the step of installing a building access conduit extending from the second fitting into the building.

9. The method of claim 1 where the routing of the branch line cable into, through and out of the service line is performed by hand manipulation of the branch line cable.

10. The method of claim 1 where the primary cable and the branch line cable comprise optical fibers.

11. The method of claim 1 where the routing of the service line conduit into, through and out of the service line is performed by hand manipulation or via duct shuttle of the service line conduit.

12. The method of claim 1 where the routing of the service line conduit is performed via use of a duct shuttle.

13. A method for connecting a primary cable extending through an in ground natural gas main pipeline to a building, via a service line connecting the gas main pipeline to the building, comprising the steps of:
    closing off the service line from the main pipeline at a first location;
    purging natural gas from the service line downstream from the first location;
    installing first and second conduit fittings into the service line alter purging the gas from the service line;
    connecting a branch line conduit to the first fitting;
    routing a service line conduit through the first fitting, into the service line;
    routing the service line conduit through the service line to the second fitting;
    routing the service line conduit through the second fitting and out of the service line;
    connecting a branch line conduit from the second fitting into the building;
    sealing the first fitting and the second fitting around the service line conduit, to prevent natural gas leakage at the first and second fittings;
    re-opening up the service line to the main pipeline; and
    installing optical fiber cable through the branch line conduit and the service line conduit.

14. The method of claim 13 where the service line is closed off from the main pipeline by closing a service line valve positioned between the main pipeline and the first fitting or by pinching the service line.

15. The method of claim 13 further comprising the step of connecting a temporary gas source into the service line, at a location between the building inlet and the gas meter valve.

16. A method for providing a telecommunications link through a gas main pipeline to a building, via a service line connecting the gas main pipeline to the building, comprising the steps of:
    closing off the service line from the main pipeline at a first location;
    purging natural gas from the service line downstream from the first location;
    installing first and second conduit fittings into the service line after purging the gas from the service line;
    routing a service line conduit through the first fitting, into the service line;
    routing the service line conduit through the service line to the second fitting;
    routing the service line conduit through the second fitting and out of the service line;
    connecting a branch line conduit to the first fitting from a cable splice panel;
    connecting the branch line conduit from the second fitting to a telecommunications panel to the building;
    sealing the first fitting and the second fitting around the service line conduit to prevent natural gas leakage at the first and second fittings;
    re-opening up the service line to the main pipeline; and
    installing optical fiber cable through the branch line conduit and service line conduit.

17. The method of claim 16 where the service line is closed off from the main pipeline by closing a service line valve positioned between the main pipeline and the first fitting a by pinching the service line.

18. The method of claim 16 where gas is purged from the service line by introducing compressed inert gas into the service line adjacent a first end of the service line, and venting a second end of the service line.

19. The method of claim 16 where the service line extends into a gas meter valve, and the second fitting is adjacent to the gas meter valve.

20. The method of claim 19 further comprising the step of connecting a temporary gas source into the service line, at a location between the building inlet and the gas meter valve.

21. A method for routing a branch cable through a gas service pipe connecting a main pipeline to a building, comprising the steps of:
    closing off the service pipe from the main pipeline;
    installing first and second cable fittings onto the service pipe;
    routing the branch cable through the first fitting, into the service pipe;
    routing the branch cable through the service pipe to the second fitting;
    routing the branch cable through the second fitting;
    sealing the first fitting and the second fitting around the branch cable, to prevent gas leakage at the first and second fittings; and
    re-opening the service pipe to the main pipeline.

22. The method of claim 21 further comprising the step of connecting the branch cable to a distribution panel in or adjacent to a building supplied with gas via the service pipe.

23. The method of claim 21 further comprising the step of transmitting voice or data via the branch cable.

24. A method for routing a branch conduit through a gas service pipe connecting a main pipeline to a building, comprising the steps of:
    closing off the service pipe from the main pipeline;
    installing first and second conduit fittings onto the service pipe;
    routing the branch conduit through the first fitting, into the service pipe;
    routing the branch conduit through the service pipe to the second fitting;
    routing the branch conduit through the second fitting;
    routing a cable through the conduit;
    sealing the first fitting and the second fitting around the branch conduit, to prevent gas leakage at the first and second fittings; and
    re-opening the service pipe to the main pipeline.

25. A method for routing a primary cable or conduit extending through a gas pipeline into a gas service pipe, comprising the steps of:
    closing off the service pipe from the main pipeline at a first location;
    purging gas from the service pipe downstream from the first location;
    installing first and second fittings onto the service pipe after purging the gas from the service pipe;
    connecting a branch cable or conduit to the primary cable or conduit;
    routing the branch cable or conduit through the first fitting, into the service pipe;
    routing the branch cable or conduit through the service pipe to the second fitting;
    routing the branch cable or conduit through the second fitting and out of the service pipe;
    sealing the first fitting and the second fitting around the branch cable or conduit; and
    re-opening up the service pipe to the gas pipeline.

26. A method for routing a primary cable or conduit extending through a gas pipeline into a gas service pipe, comprising the steps of:
    closing off the service pipe from the main pipeline at a first location;
    installing first and second fittings onto the service pipe connecting a branch cable or conduit to the primary cable or conduit;
    routing the branch cable or conduit through the first fitting, into the service pipe;
    routing the branch cable or conduit through the service pipe to the second fitting;
    routing the branch cable or conduit through the second fitting and out of the service pipe;
    connecting the branch cable or conduit to a distribution junction in or adjacent to a building supplied with gas via the service pipe; and
    re-opening up the service pipe to the gas pipeline.

27. The method of claim 26 further including the step of purging gas from the service pipe downstream from the first location.

28. The method of claim 26 further including the step of sealing the first fitting and the second fitting around the branch cable or conduit.

* * * * *